(12) United States Patent
Pellerin et al.

(10) Patent No.: US 6,918,423 B2
(45) Date of Patent: Jul. 19, 2005

(54) CONCENTRIC BELL ASSEMBLY

(75) Inventors: Dan Pellerin, Howell, MI (US); Chad A. Sinke, Hartland, MI (US); Boris R. Teper, Farmington Hills, MI (US); Brian Hoy, Brighton, MI (US)

(73) Assignee: Dürr Production Systems, Inc., Farmington, MI (US)

( * ) Notice: Subject to any disclaimer, the term of this patent is extended or adjusted under 35 U.S.C. 154(b) by 92 days.

(21) Appl. No.: 10/687,145

(22) Filed: Oct. 16, 2003

(65) Prior Publication Data
US 2004/0140058 A1 Jul. 22, 2004
(Under 37 CFR 1.47)

Related U.S. Application Data
(60) Provisional application No. 60/419,237, filed on Oct. 17, 2002.

(51) Int. Cl.[7] .......................................... B60C 25/132
(52) U.S. Cl. .......................................... 157/1.2; 157/1
(58) Field of Search ............................ 157/1, 1.17, 1.2

(56) References Cited

U.S. PATENT DOCUMENTS

| 3,978,903 | A | * | 9/1976 | Mueller et al. ............... 157/1.2 |
| 5,146,969 | A | * | 9/1992 | Kawabe et al. ............... 157/1.2 |
| 6,029,716 | A | | 2/2000 | Hawk |
| 6,463,982 | B1 | * | 10/2002 | Doan .......................... 157/1.17 |
| 6,467,524 | B2 | | 10/2002 | Ronge et al. |
| 6,502,618 | B1 | | 1/2003 | Kane et al. |
| 2001/0013396 | A1 | | 8/2001 | Ronge et al. |

FOREIGN PATENT DOCUMENTS

EP         1110765 A2    6/2001

* cited by examiner

Primary Examiner—James G. Smith
(74) Attorney, Agent, or Firm—Howard & Howard

(57) ABSTRACT

A bell assembly for inflating a tubeless tire on a wheel includes a first bell and a second bell slidably disposed within the first bell. The second bell includes a smaller diameter than the first bell. A shaft extends upwardly from the second bell in one of a relative to the first bell. A locking member is engagable with the shaft and is movable between a first locking position and a second locking position. The locking member secures the second bell in the first bell position when the locking member is disposed in the first locking position. The locking member secures the second bell in the second bell position when the locking member is disposed in the second locking position.

18 Claims, 4 Drawing Sheets

CONCENTRIC BELL ASSEMBLY

PRIOR APPLICATIONS

This Application claims priority to Provisional Application No. 60/419,237 filed Oct. 17, 2002.

FIELD OF THE INVENTION

The present invention relates generally toward a bell assembly for inflating a tubeless tire on a wheel. More specifically, the present invention relates to an improved concentric bell assembly used to inflate multiple tire sizes.

BACKGROUND OF THE INVENTION

Conventional wheel and tire assemblies used to support a motor vehicle include a tubeless tire having a bead that seals to a wheel flange in order to maintain a desirable air pressure between the tire and wheel. In mass production settings, it is necessary to inflate the tire rapidly in order to prevent a bottleneck in the assembly process. To rapidly inflate the tire, a bell, which circumscribes a wheel, is lowered to depress the tire separating the tire bead from the wheel flange. The bell forms a sealed enclosure with the tire interior enabling pressurized air to be injected through the bell into the tire interior at a high pressure and rate. The cavity formed between the bell and the tire interior is pressurized to a level slightly above the desired inflation pressure of the tire. Subsequent to pressurizing this cavity, the bell is rapidly withdrawn from the tire allowing the tire bead to seal against the wheel flange, trapping the pressurized air between the tire and the wheel at the desired pressure.

In recent years, vehicle-manufacturing processes have advanced to allow for the production of multiple vehicles on the same assembly line such as, for example, a truck and a compact car. Therefore, it has become necessary to inflate larger ranges of tire sizes on the same assembly line. One type of bell assembly capable of inflating large ranges of tire sizes utilizes a first bell and a second bell slidably disposed within the first bell. The second bell includes a smaller diameter than the first bell and is used to inflate small diameter tires. The first bell having a larger diameter than the second bell is used to inflate larger diameter tires.

When inflating larger diameter tires, the second bell is retracted within the first bell so that the first bell depresses the large diameter tire to inflate the tire as set forth above. When inflating a smaller diameter tire, the second bell is extended to a position beyond the first bell so that the second bell only is used to inflate the smaller diameter tire. Bell assemblies of this type are disclosed in U.S. Pat. Nos. 6,029,716, 6,467,524, 6,463,982, and 6,502,618.

To establish a sufficient seal with the smaller diameter tires, it is necessary to provide sufficient force to the second bell to prevent air leakage during the inflation process. The prior art patents listed above disclose various methods for establishing a depression force that are primarily fluidic in nature. Providing a depression force to the second bell in this manner result in several drawbacks that could cause an inconsistent depression force upon a tire being inflated. For example, disruption in fluid supply or degradation of a fluid seal can result in the loss of depression force provided to the second bell. This could result in inadequate pressurization of the tire. Therefore, it would be desirable to provide a consistent yet simple assembly to provide a consistent depression force to the second bell.

SUMMARY OF THE INVENTION

A bell assembly for inflating a tubeless tire on a wheel includes a first bell and a second bell slidably disposed within the first bell. The second bell includes a smaller diameter than the first bell. A shaft extends upwardly from the second bell to secure the second bell in one of a first and a second bell position relative to the first bell. A locking member is engagable with the shaft and moves between a first locking position and a second locking position. The locking member secures the second bell in the first bell position when the locking member is disposed in the first locking position. The locking member secures the second bell in the second bell position when the locking member is disposed in the second locking position.

When the second bell is disposed in the first bell position, a first bell depression surface disposed upon the first bell extends beyond the second bell so that the first bell depresses the tire being inflated. When the second bell is disposed in the second bell position, a second bell depression surface extends beyond the first bell so that the second bell depresses the tire being inflated. The use of the locking member to engage the shaft extending upwardly from the second bell provides a simple mechanical device that overcomes the deficiencies of the prior art bell assemblies by providing a consistent method of security to the second bell.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
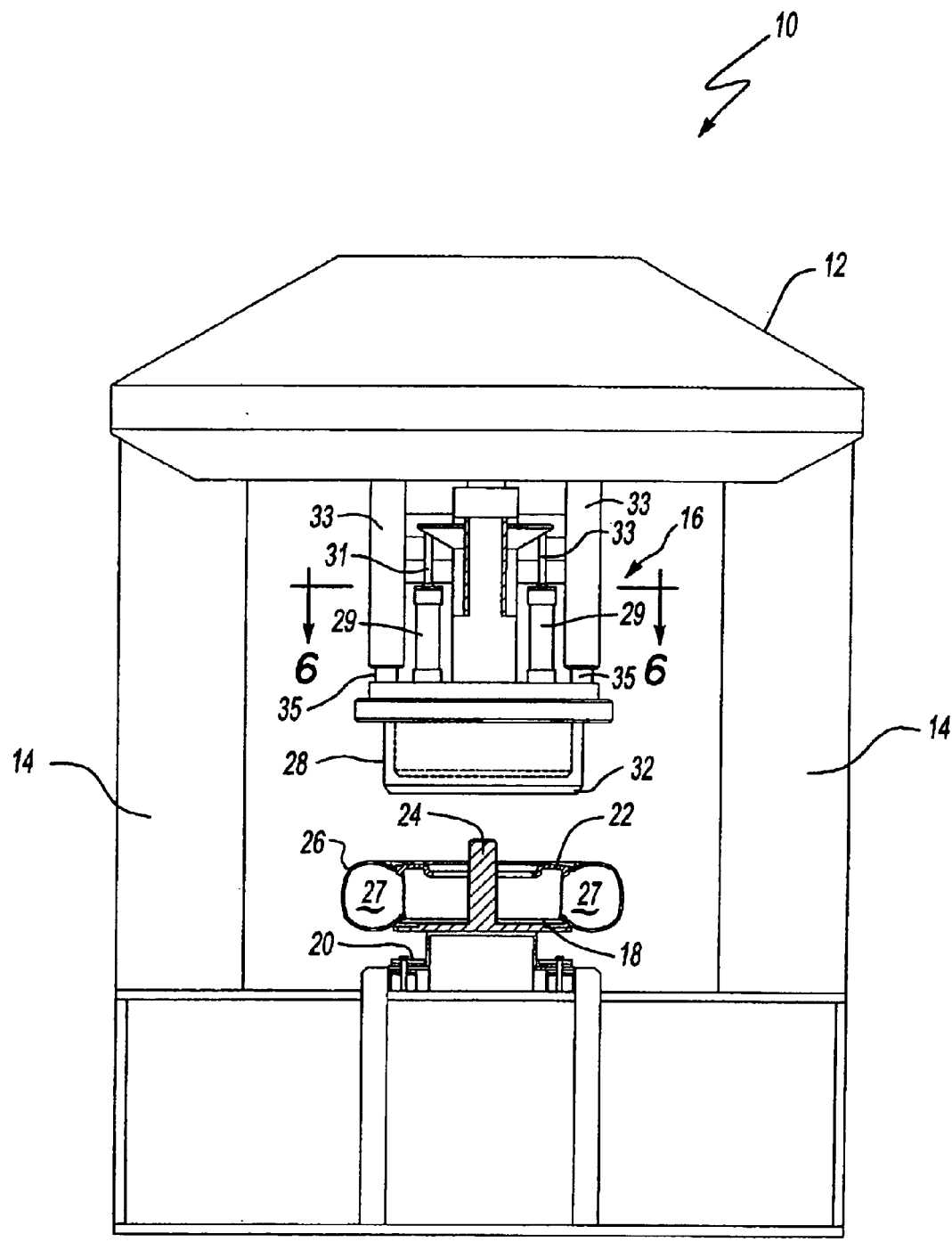
FIG. 1 is a front cross-sectional view of the inventive concentric bell assembly.

Referring to FIG. 1, an apparatus for inflating a tire is generally shown at 10. A frame 12 includes opposing support legs 14 and suspends a concentric bell assembly 16. A plurality of support trays 18 are moved sequentially beneath the bell assembly 16 by a conveyor 20 as is known to those of skill in the art. A wheel 22 is secured on the support tray 18 by a spindle 24 located to align the wheel along a common axis with the bell assembly 16 as will be explained further below. A tire 26 is previously mated to the wheel 22 in an uninflated state. The tire 26 is tubeless and forms a cavity 27 with the wheel 22.

Figure 2:
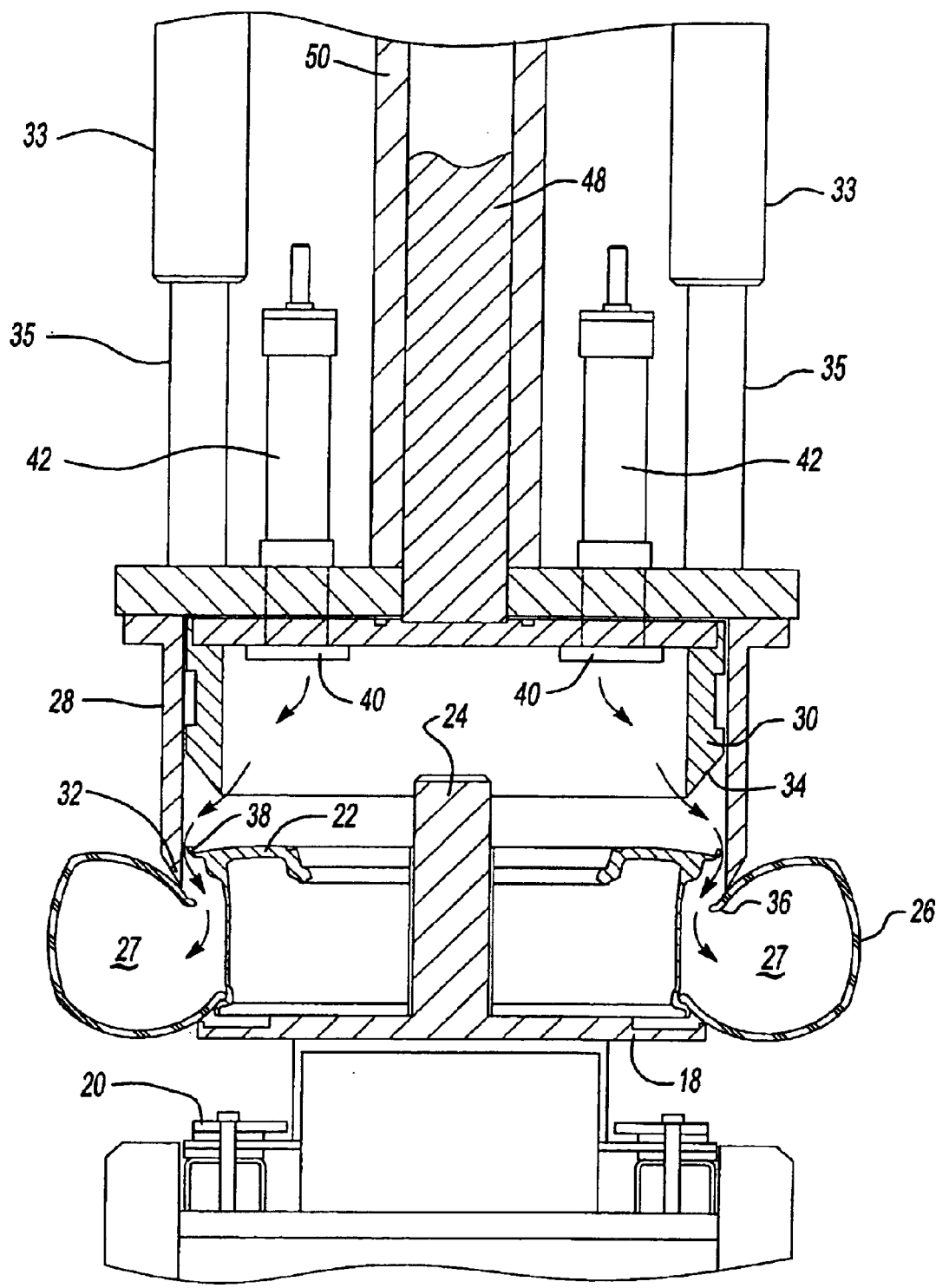
FIG. 2 shows the concentric bell assembly having the second bell secured in the first position while filling a tire assembly.

Referring to FIG. 2, the concentric bell assembly 16 is shown having a first bell 28 and a second bell 30 slidably disposed within the first bell 28. The second bell 30 has a smaller diameter than the first bell 28 and slides freely within the first bell 28.

The first bell 28 includes a first depression surface 32 and the second bell 30 includes a second depression surface 34. As is known to those of skill in the art, when inflating large diameter tires 26, the first depression surface 32 depresses the tire 26 separating a sealing bead 36 from the mating surface 38 of the wheel 22. Depressing the bead 36 forms a gap between the bead 36 and the wheel mating surface 38 through which pressurized air flows into a cavity 27 defined by the tire 26 and the wheel 22. Air is introduced to the cavity 27 via an air coupling 40 affixed to the second bell 30. Pressurized air fills the void defined by the first bell 28 while the second bell 30 is retracted within the first bell 28 and passes through the opening formed between the tire bead 36 and the wheel mating surface 38 into the cavity 27. A plurality of couplings 40 may be used when higher volumes of pressurized air are required to meet the production capacity of the assembly 10. This is best represented by a top view of the concentric bell assembly 16 seen in FIG. 6, which shows four couplings.

Figure 6:
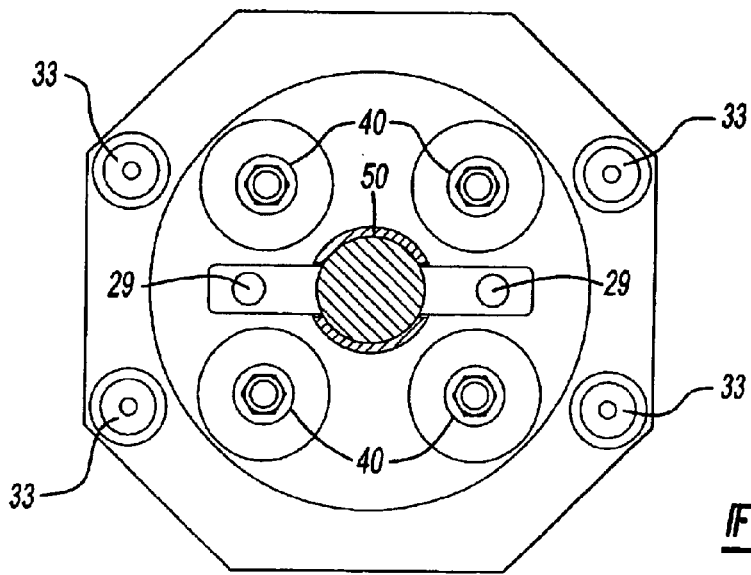
FIG. 6 is a top view of the concentric bell assembly.

Referring again to FIG. 2, the air couplings 40 receive pressurized air from air inlets 42 that are slidably received by the first bell 28 enabling the second bell 30 to slide freely within the first bell 28 as will be explained further below. Guides 33 are suspended from the frame 12 to guide the bell assembly 16 in a generally vertical orientation. A guide shaft 35 is slideably disposed within the each guide 33 and is affixed to the bell assembly 16 in a spaced relationship as best shown in FIG. 6.

Figure 3:
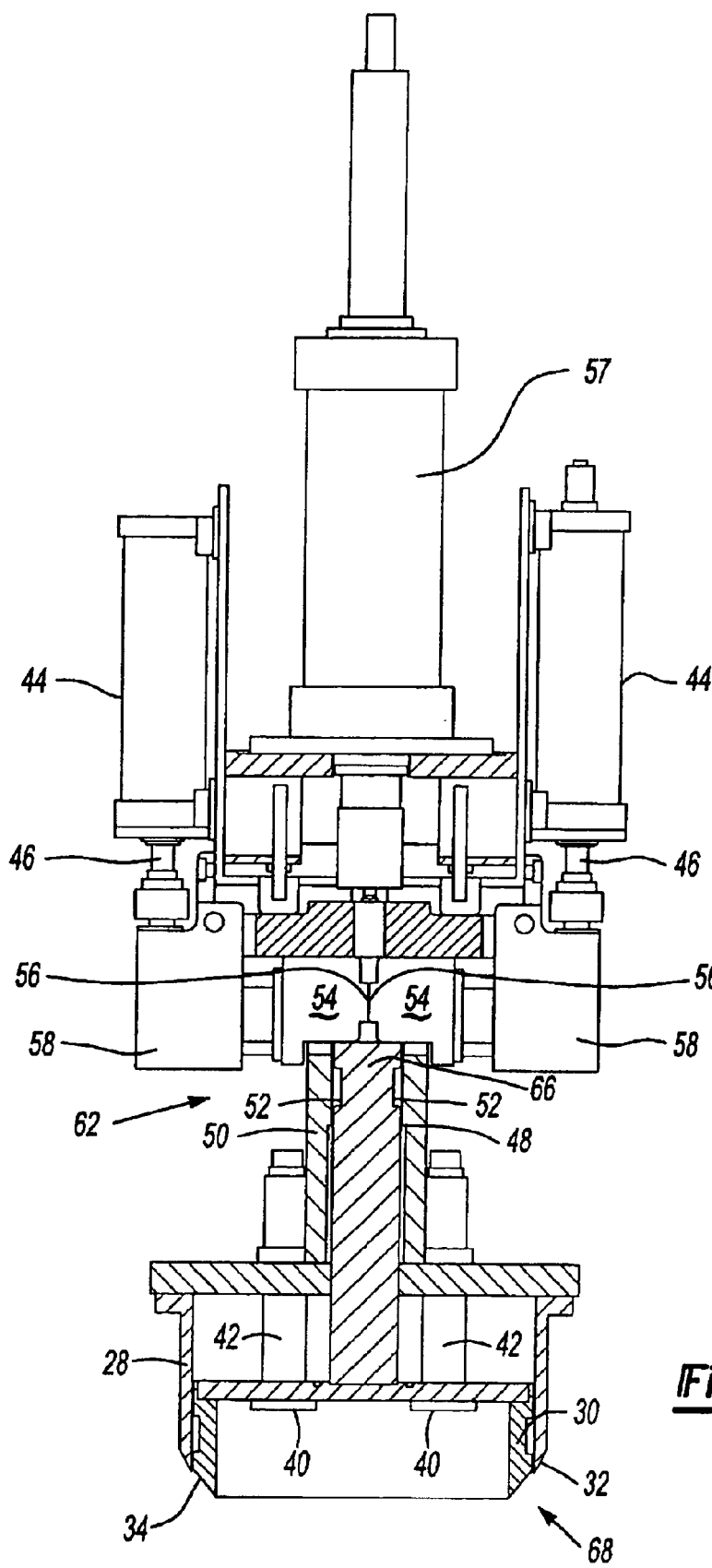
FIG. 3 is a sectional view of the concentric bell assembly having the second bell located in an extended position.

Referring now to FIG. 3, the concentric bell assembly 16 is raised and lowered by pistons 44 into and out of contact with the tire 18. The pistons 44 are preferably pneumatically actuated, however, the pistons 44 may also be hydraulically actuated. A shaft 46 extends from the pistons 44 and is operably connected to the bell assembly 16. As few as two pistons 44 may be used; however, as many as four or more pistons may be spaced about the bell assembly 16 if required. A passive cylinder 57 is generally axially aligned with the bell assembly 16 and provides a brake force to the bell assembly 16 to assure sufficient downward force is applied to the tire 26 by the bells 28, 30.

A locking shaft 48 extends upwardly from the second bell 30 through a sleeve 50. The shaft 48 is slidable relative to the first bell 28 and moves along with the second bell 30 when the second bell 30 is lowered or raised relative to the first bell 28. A catch 52 spaced from the second bell 30 on the shaft 48.

A locking member 54 is engagable with the shaft 48 to secure the shaft 48 in a desired position. Alternatively, two locking members 54 may be used, in which case, the shaft 48 would have two catches 52, the purpose of which will be explained further below. The locking member 54 is moveable in a generally perpendicular relationship to the shaft 48. The locking member includes a protuberance 56 that is receivable by the catch 52. A driving member 58 moves the locking member 54 into and out of engagement with the shaft 48. The driving member 58 is either a servomotor, a hydraulic piston, or a pneumatic piston as is known to those of skill in the art. It should be understood, that the driving member 58 is not required to produce a significant amount of force, but merely requires a sufficient force to move the locking member 54 radially inwardly and outwardly of the shaft 48.

Figure 5:
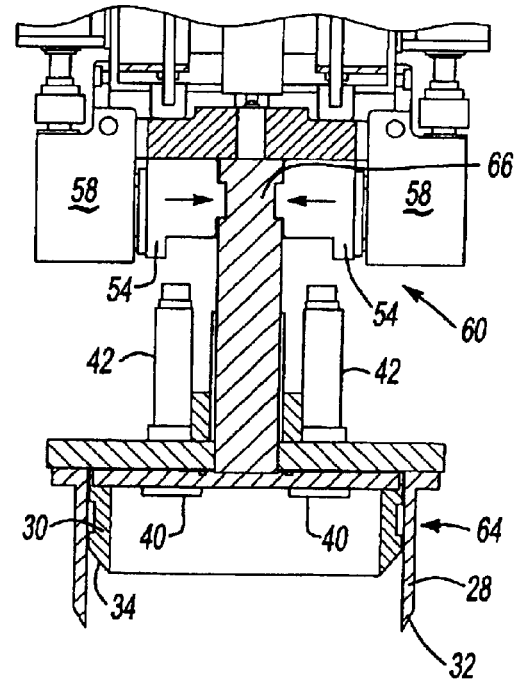
FIG. 5 shows the concentric bell assembly having the second bell located in the retracted position.

The locking member is moveable between a first locking position 60 as best seen in FIG. 5 and a second locking position 62 as best seen in FIG. 3. When the locking member 54 is disposed in the first locking position 60, the protuberance 56 on the locking member 54 engages the catch 52, thereby securing the second bell 30 in the first bell position 64. When the second bell 30 is disposed in the first bell position 64, the first depression surface 32 of the first bell 28 extends beyond the second depression surface 34 of the second bell 30 for depressing a large diameter tire 26 as shown in FIG. 2.

The locking shaft 48 includes a distal end 66 that is spaced from the second bell 30. To secure the second bell 30 in a second bell position 68, as shown in FIG. 3, the locking member 54 is disposed in the second locking position 62 and the distal end 66 of the locking shaft 48 is positioned in an abutting relationship with the locking member 54 thereby securing the second bell 30 in the second bell position 68. Accordingly, the second depression surface 34 of the second bell 30 is spaced beyond the first depression surface 32 of the first bell 28 for depressing smaller diameter tires 26 (not shown). It should be understood that when two locking members 54 are used, the locking members 54 are slidably disposed in an opposing relationship so that the locking members 54 move radially inwardly of the locking shaft 48 to secure the second bell 30 in one of the first or second bell positions 62, 68. To secure the second bell 30 in the second bell position 68, the locking members 54 abut defining an abutment surface for the distal end 66 of the locking shaft 48.

Figure 4:
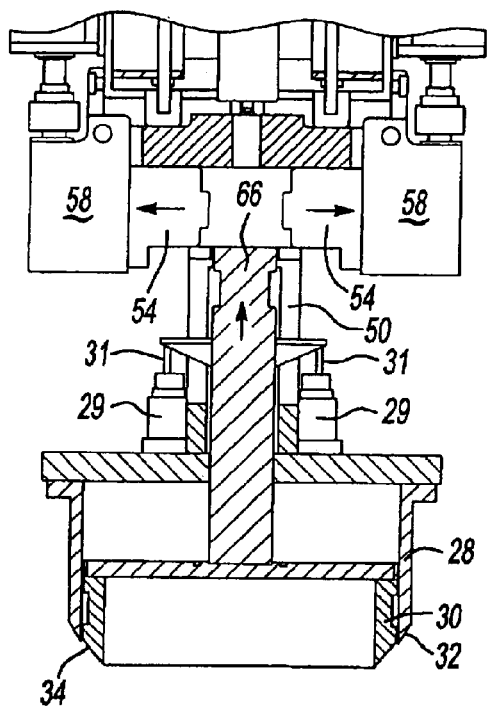
FIG. 4 shows the concentric bell assembly having the second bell moving to a retracted position.

As best shown in FIG. 4, a positioning member 29 provides driving force to the second bell 30 to move the second bell 30 between first position 64 and second position 68. The positioning member 29 is mounted to a horizontal surface of the first bell 28. A driving shaft 31 extends upwardly from the positioning member 29 and is operably attached to the locking shaft 48. Therefore, the positioning member 29 providing driving movement to the locking shaft 48 for translating motion to the second bell 30 to move the second bell 30 between the first position 64 and the second position 68. Preferably, the two positioning members 29 are positioned on opposite sides of the locking shaft 48 as shown in FIG. 6. The positioning member 29 preferably derives driving force from pneumatic pressure. However, the positioning member 29 merely provides enough force to the second bell 30 to move the second bell 30 between the first and second bell positions 64, 68 and does not need to provide force to secure the second bell 30 against the tire 26 due to the interaction between the locking shaft 48 and the locking member 54.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A bell assembly for inflating a tubeless tire on a wheel, comprising:

a first bell and a second bell slidably disposed within said first bell, wherein said second bell includes a lesser diameter than said first bell;

a shaft slidably supporting said second bell in one of a first and a second bell position relative to said first bell;

a locking member engagable with said shaft and movable between a first locking position and a second locking position, wherein said locking member secures said second bell in said first bell position when said locking member is disposed in said first locking position and said locking member secures said second bell in said second bell position when said locking member is disposed in said second locking position.

2. An assembly as set forth in claim 1, wherein said locking member is movable in a generally perpendicular relationship relative to said bell shaft.

3. An assembly as set forth in claim 1, wherein said bell shaft includes a catch and said locking member includes a protuberance receivable by said catch thereby securing said second bell in said first bell position.

4. An assembly as set forth in claim 1, wherein said bell shaft includes a distal end space from said second bell, said distal end being abuttable with said locking member thereby securing said second bell in said second bell position.

5. An assembly as set forth in claim 1, comprising an extender drivably engaging said second bell thereby moving said second bell between said first and said second bell positions.

6. An assembly as set forth in claim 1, comprising two locking members slidably disposed in an opposing relationship, wherein said locking members move radially inwardly of said bell shaft thereby securing said second bell in one of said first and said second positions.

7. An assembly as set forth in claim 6, wherein said two locking members are movable radially inwardly of said bell shaft to a generally abuttable relationship thereby providing an abutment surface for a distal end of said bell shaft.

8. An assembly as set forth in claim 6, wherein said two locking members are movable radially inwardly toward said bell shaft to an interlocking relationship with said bell shaft thereby securing said shaft in said second bell position.

9. An assembly as set forth in claim 1, further comprising an air coupling providing pressurized air to said second bell and being slidable relative to said first bell.

10. An assembly as set forth in claim 1, including a driving mechanism operably connected to said locking member for moving said locking member between first and second locking position.

11. A method of securing a tire inflating assembly having first bell concentrically aligned with a second bell, wherein said second bell is fixedly attached to a bell shaft axially aligned with said first and second bell and being slidable relative to said first bell, comprising the steps of:

providing a locking member movable between a first locking position and a second locking position; and moving said locking member to one of said first locking position and said second locking position;

securing said bell shaft with said locking member in one of a first bell position and a second bell position thereby positioning said second bell in one of said first bell position and said second bell position.

12. The method as set forth in claim 11, wherein said step of moving said locking member to one of said first position and said second position comprises moving said locking member in a generally perpendicular relationship to said bell shaft.

13. The method as set forth in claim 11, wherein said step of moving said locking member to said first position is further defined by interlocking said bell shaft when said locking member is moved to said first position.

14. The method as set forth in claim 11, wherein said step of moving said locking member to said second position is further defined by positioning said locking member in an abutting relationship with said bell shaft.

15. The method as set forth in claim 11, wherein said step of securing said first said bell shaft in said first position comprises securing said second bell in a retracted position relative to said first bell.

16. The method as set forth in claim 11, wherein said step of securing said first bell shaft in said second position comprises securing said second bell in an extended position relative to said first bell.

17. The method as set forth in claim 11, wherein said step of moving said locking member to one of said first locking position and said second locking position comprises moving two locking members to one of said first locking position and said second locking position.

18. The method as set forth in claim 17, further including the step of moving said locking members into an abutting relationship thereby providing an abutment surface for said bell shaft.

* * * * *